April 2, 1963 — A. M. MOEN — 3,083,725

FLUID CONTROLLING VALVE STRUCTURE

Filed June 5, 1961

INVENTOR.
ALFRED M. MOEN
BY
Robinson & Berry
ATTORNEYS

3,083,725
FLUID CONTROLLING VALVE STRUCTURE
Alfred M. Moen, 25 Lakeview Drive, Grafton, Ohio
Filed June 5, 1961, Ser. No. 114,765
3 Claims. (Cl. 137—454.2)

This invention relates to improvements in fluid controlling valve structures as designed for installation within a tube or duct to control flow of fluid therethrough. More particularly, this invention relates to a ball valve structure having few parts, viz, an annular valve seat, a ball valve member applied thereto and a handle for effecting flow rotation controlling adjustments of the valve member.

It is the primary object of this invention to provide a valve structure of the above stated character that may be readily applied at any location within a tubular duct without difficulty; that is simple in its construction in its assembly of parts, and in its mode of operation and is self-sealing and relatively inexpensive in its construction.

In accomplishing the above mentioned and other objects of the invention, I have provided the improved details of construction, the preferred forms of which are illustrated in the accompanying drawings, wherein.

Referring more in detail to the drawings:
The present valve structure has been shown in FIGS. 1, 2 and 3, as applied to a tubular pipe line 10 of cylindrical formation, such as might be employed for conduction of liquid or gaseous substances under pressure. The valve structure, apart from the duct, comprises a spherically formed "ball" valve 12, fitted within an annular seat forming member 13 in which it is rotatably adjustable by means of a handle member 14.

The duct or pipe line 10 might be such as that used for conduction of water, gas, oil or other fluid substances which usually are confined under pressure. To prepare for the installation of the valve structure in this pipe line, holes are bored in its opposite sidewalls, in diametric alignment at the selected place of valve installation, as has been designated by numerals 15—15 in FIG. 1.

Figure 1:
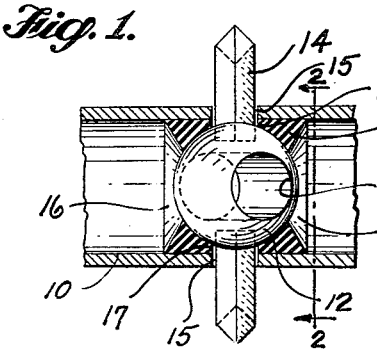
FIG. 1 is a longitudinal sectional view of a tubular duct in which a valve structure embodying the present invention has been applied.

The valve seat 13 of this assembly is of annular formation and has its outside surface shaped to conform to and seal against the inside surface of the tubular duct 10. Ordinarily such ducts are truly cylindrical but might be of oval or other cross-sectional formation for special purposes; it being required only that the member 13 be molded to conform thereto. This annular member 13 is molded of a flexible conformative material, preferably of rubber, or the like, and has a spherically curved seat 18 centrally thereof with a diameter only slightly less than that of the duct 10. This spherical seat has openings 16—16 leading therefrom to its opposite ends as shown in FIG. 1. These are seen to be outwardly conically flared to the full inside diameter of tube 10. The member 13 also is formed, at the opposite sides thereof and midway of its ends, with holes 17—17 in diametric axial alignment for their registration with the holes 15—15 of the duct 10 when the annular member is assembled in the duct 10 as presently explained.

The rotatably adjustable valve 12 may be of any suitable material such as metal, plastic, rubber, etc., and is of spherical formation. It is fitted within the spherical seat of the annular member 13 and is formed with a cylindrical passage 20 diametrically therethrough which, by rotatable adjustment of the valve member in its seat, may be aligned with the openings 16—16 coaxially of the duct 10 for flow of fluid through the valve duct. By turning the valve member a ninety degree interval to dispose the passage 20 transversely of the duct, the flow will be cut off as by use of the usual types of valve. Also, the ball member 12 is formed in its outer surface and in diametric alignment, with sockets 21—21 for reception of a valve handle as presently described.

Assuming that the annular seat forming member 13 and the ball valve member 12 are so formed, their assembly with each other and in the duct 10 is as follows: The valve member 12 is first pressed into the spherical seats of the annular member 13 and its sockets 21—21 aligned with the holes 17—17 of said annular member. The annular member 13, with ball valve contained therein, is pushed endwise into the duct 10 to register the sidewall holes 17—17 with the holes 15—15 in the walls of the duct 10.

Figure 2:
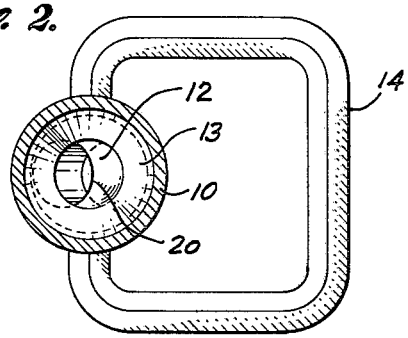
FIG. 2 is a cross-section, taken on line 2—2 in FIG. 1.
Figure 3:
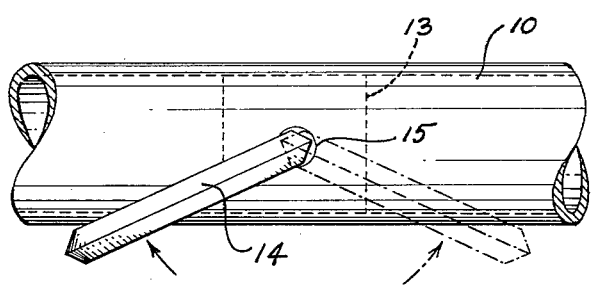
FIG. 3 is an outside view of a portion of a tubular duct to which a valve embodied by this invention has been applied.

The valve operating handle 14 is then applied as shown in FIGS. 2 and 3. Preferably, this handle is of an open loop formation with inturned end portions in spaced, axial alignment, adapted to be projected into and through the registering holes 15 and 17 at opposite sides of the assembly and engaged at their inner ends in interlocked connection with the ball sockets 21—21 in its opposite side. By swinging the handle 14 in opposite directions along the duct, as indicated in FIG. 3, the ball valve 12 will be rotatably adjusted accordingly from closed to open positions or to any intermediate position of adjustment thus to control flow of liquid through the duct. It is preferred that the length of the open loop handle member shall be such that its swinging movement in opening and closing directions will be limited by its contact with the pipe 10 at the full open and fully closed positions of the ball valve. It is to be understood, however, that handles of various forms might likewise be applied for use without departing from the spirit of the invention.

Figure 4:
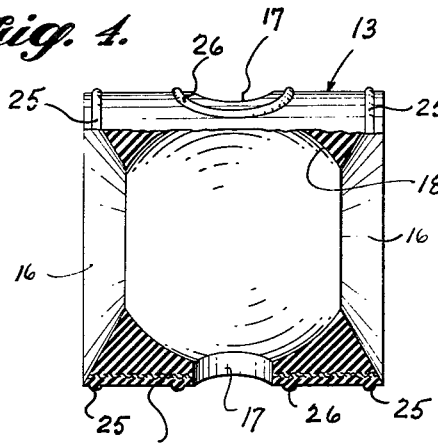
FIG. 4 is an enlarged sectional view of the ball valve seat, showing certain advantageous features of its construction.

It is further anticipated that the annular member 13 may be formed exteriorly of its surface about its end portions with slightly raised beads of ridges as at 25 in FIG. 4 to aid in the joint sealing effect between the duct and seat forming member. Likewise, beads as at 26 may be formed closely about the two holes 17—17 to give better joint sealing at these places where the handle ends enter.

It is also anticipated that the member 13 shall have reinforcing fabric 27 embedded therein to give resistance to longitudinal stretching of the member but to permit radial expansion of the member for ball valve seating purposes. In lieu of fabric, materials such as metal strips, wire loops or metal screen may be used to resist longitudinal stretching.

Figure 5:
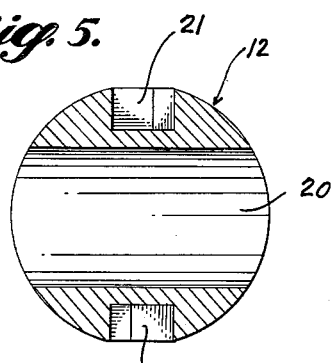
FIG. 5 is a cross-sectional view of the rotatably adjustable valve member to be applied to the seat.
Figure 6:
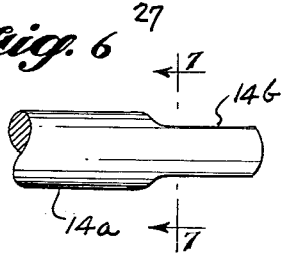
FIG. 6 is a detail of the handle construction.
Figure 7:
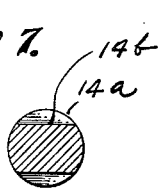
FIG. 7 is a cross section on line 7—7 in FIG. 6.

In FIG. 5, I have shown that the sockets 21—21 are generally square in form. However, these sockets may be modified to accommodate the handle structure 14a illustrated in FIGS. 6 and 7 wherein the handle is round and the end portions 14b are flattened as at 14c. The rounded surface of the handle is designed to fit the holes 15—15 in the tube 10 and the flattening of the end portions gives better holding effect in the ball valve sockets.

One of the important advantages of this valve resides in the fact that it is readily applicable to a duct of cylindrical and tubular formation at any place along its length. It will, under pressure of liquid in the line, maintain its duct sealing condition, yet will be operable to control flow through the duct whether it be liquid or gas.

What I claim as new is:

1. A valve structure consisting of a pipe-like, tubular conduit and a valve mechanism movable longitudinally into and from said conduit and having diametrically aligned sidewall openings formed therein, said conduit being of uniform diameter between at least one end thereof and said openings, said valve mechanism including a valve seat of resilient material formed with an axial flow passage extending between its opposite ends and a spherical valve seating chamber formed in said passage intermediate its ends, aligned side wall openings formed in said valve seat and registerable with the sidewall openings in said conduit, a spherical valve member fitted in water tight engagement in said valve seat, said valve member having a diametric flow passage formed therethrough, handle receiving sockets formed in said valve member at opposite sides of and perpendicular to said flow passage, a handle member of loop form having inturned end portions and said inturned end portions, respectively, extending through said sidewall openings in the conduit and valve seat and into said sockets.

2. A combination according to claim 1 wherein the registered openings of the conduit and valve seat are of circular form and are equal in diameter and said sockets as formed in the valve member are unround and said opposite ends of the handle are fitted thereto.

3. A combination according to claim 1 wherein the handle member of looped formation is limited in its swing in opposite direction to an arc of approximately 90° to adjust the spherical valve member for positioning of its flow channel in axial registration with the flow passage of the valve seat or in a position transversely thereof.

References Cited in the file of this patent

UNITED STATES PATENTS

| | | |
|---|---|---|
| 1,236,297 | Hensen | Aug. 7, 1917 |
| 2,117,456 | Schellin | May 17, 1938 |
| 2,766,961 | Meusy | Oct. 16, 1956 |
| 2,856,952 | Stillwagon | Oct. 21, 1958 |
| 2,864,580 | Lemoine | Dec. 16, 1958 |
| 2,945,666 | Freeman | July 19, 1960 |

FOREIGN PATENTS

| | | |
|---|---|---|
| 339,892 | Great Britain | Dec. 18, 1930 |
| 490,746 | France | Jan. 10, 1919 |